(No Model.)  8 Sheets—Sheet 1.

F. H. RICHARDS.
WEIGHING MACHINE.

No. 600,042.  Patented Mar. 1, 1898.

Fig. 1.

Witnesses:
W. S. Hawkins.
Fred. J. Dole.

Inventor:
F. H. Richards.

(No Model.) 8 Sheets—Sheet 2.

F. H. RICHARDS.
WEIGHING MACHINE.

No. 600,042. Patented Mar. 1, 1898.

Fig. 2.

Witnesses:
W. S. Hawkins.
Fred. J. Dole.

Inventor:
F. H. Richards.

(No Model.)

F. H. RICHARDS.
WEIGHING MACHINE.

Patented Mar. 1, 1898.

Fig.3.

Witnesses:
D. S. Hawkins.
Fred. J. Dole.

Inventor:
F. H. Richards (No Model.)  8 Sheets—Sheet 4.

F. H. RICHARDS.
WEIGHING MACHINE.

No. 600,042.  Patented Mar. 1, 1898.

Fig. 4.

Witnesses:
D. S. Hawkins.
Fred. J. Dole.

Inventor:
F. H. Richards.

(No Model.) 8 Sheets—Sheet 5.

F. H. RICHARDS.
WEIGHING MACHINE.

No. 600,042. Patented Mar. 1, 1898.

*Fig. 5.*

Witnesses:
W. S. Hawkins.
Fred. J. Dole.

Inventor:
F. H. Richards, (No Model.) 8 Sheets—Sheet 6.

F. H. RICHARDS.
WEIGHING MACHINE.

No. 600,042. Patented Mar. 1, 1898.

Witnesses:
W. S. Hawkins.
Fred. J. Dole.

Inventor:
F. H. Richards (No Model.)

F. H. RICHARDS.
WEIGHING MACHINE.

No. 600,042. Patented Mar. 1, 1898.

Witnesses:
W. S. Hawkins.
Fred. J. Dole.

Inventor:
F. H. Richards (No Model.) 8 Sheets—Sheet 8.

F. H. RICHARDS.
WEIGHING MACHINE.

No. 600,042. Patented Mar. 1, 1898.

Witnesses:
D. S. Hawkins.
Fred. J. Dole.

Inventor:
F. H. Richards ns.

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,042, dated March 1, 1898.

Application filed September 13, 1897. Serial No. 651,503. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines; and the object of the invention is to provide an improved machine of this character for accurately weighing different kinds of materials; and it includes, in connection with the weighing mechanism, means, broadly and preferably independently of the stream-controller, for effecting the transmittal of the force or energy generated by a body of material supplied to the weighing mechanism to different points on said mechanism.

My invention also comprehends poising and counterpoising means, the first-mentioned including a load-receiver, stream-supplying means for the load-receiver, and a device, termed a "stream-force transmitter," located to receive the impact of the supply-stream and to transmit part of the force or energy generated thereby to the counterpoising means.

The weighing-machine comprises a load-receiver and supporting mechanism therefor, the latter being preferably composed of one or a series of counterweighted scale-beams, as necessity may require, although other means for sustaining the load-receiver may be employed. In the construction illustrated the poising means consists of the load-receiver and a portion of the beam mechanism and the counterpoising means of the remainder of the beam mechanism. To the counterpoised side of the beam mechanism the stream-force transmitter preferably applies its effect and transfers thereto part of the force or energy due to the impact of the supply-stream, which subsequently enters the load-receiver, so as to cause such force to be applied to opposite sides of the center of oscillation of the beam mechanism upon which the load-receiver is sustained, thereby neutralizing the effect of the stream and permitting the weighing mechanism to operate normally, notwithstanding changes in the volume of the supply or in the specific gravity of the material or materials being weighed.

In the drawings accompanying and forming part of this specification.

Similar characters designate like parts in all the figures of the drawings.

The framework for supporting the several parts of the machine may be of any suitable character, it consisting in the present case of the chambered base or bed 2, the side frames 3 and 4, mounted thereon, and the brackets 5 and 6, which extend oppositely from the supply-hopper and which rest on the side frames 3 and 4, respectively. The hopper H constitutes a convenient device for supplying a stream of material to the load-receiver for building up the load, although it is apparent that other means may be substituted for this purpose without affecting the scope of the invention and that the material may be supplied by manual labor, if desired.

The load-receiver (see Figs. 1 to 5) is designated by G, and it is suspended upon the poising or inner ends of the two beams B and B', which are mounted on the base 2, the axes of oscillation of the beams being denoted, respectively, by $x$ and $x'$.

The poising means of the machine comprises all that part of the weighing mechanism situated between the axes of oscillation of the two beams and includes the load-receiver, and the counterpoising means consists of those portions of the beams located outside of the beam-supports 7 and 8, said supports being the usual notched plates upon which the bearing-surfaces of the projecting knife-edges 9 and 10 of the several beams are pivotally mounted.

The load-receiver G has the usual discharge-outlet normally covered by the closer or discharge valve L, pivoted to the load-receiver at 12 and counterweighted at 13, said counterweight serving to shut the closer on the discharge of a load. The means for holding the closer shut includes a latch L' of the ordinary kind counterweighted and pivoted to the load-receiver and in proper position to engage the arm 14 of the rocker 15, carried by the rock-shaft 16.

The rock-shaft 16 is supported in the bearings 17 and 18 on the upper end of the load-receiver and is provided at one end with a crank-arm 18', to which and to the arm 19 of the rocker the rods 20 and 21 are pivoted, said rods being similarly joined at their lower ends to the opposite sides of the closer. On the completion of a load the latch L' is tripped, which results in the release of the closer, and the weight of the load in the receiver G then forces said closer open.

The supply-hopper H serves as a convenient means for delivering a stream of material to the load-receiver G to build up the load therein, and for the purpose of stopping the flow into said load-receiver on the completion of a load a stream-controller of ordinary kind is provided.

The stream-controller shown consists of a swinging valve V of the "pan" type, reciprocatory beneath the discharge orifice or outlet of the hopper and adapted when in its normal position to arrest the supply to the load-receiver, and this valve is provided with the oppositely-disposed laterally-projecting arms 25 and 26, supported between the side frames 3 and 4 by the pivots 27 and 28. Any other form of stream-controller suitable for the purpose may be employed as a substitute for that shown, if deemed desirable.

For shutting the valve V the arm 25 thereof is equipped with a rearwardly-extending projection 30, having the weight 31, which tends normally to close the valve, this action, however, being limited by the beam mechanism or by the auxiliary beam B'', against the inner end of which the rod 32 is adapted to bear. The rod 32 is pivoted at its upper end to the crank 33 on the arm 25 of the valve and is connected with the frame member 3 by the link 34.

Figure 5:
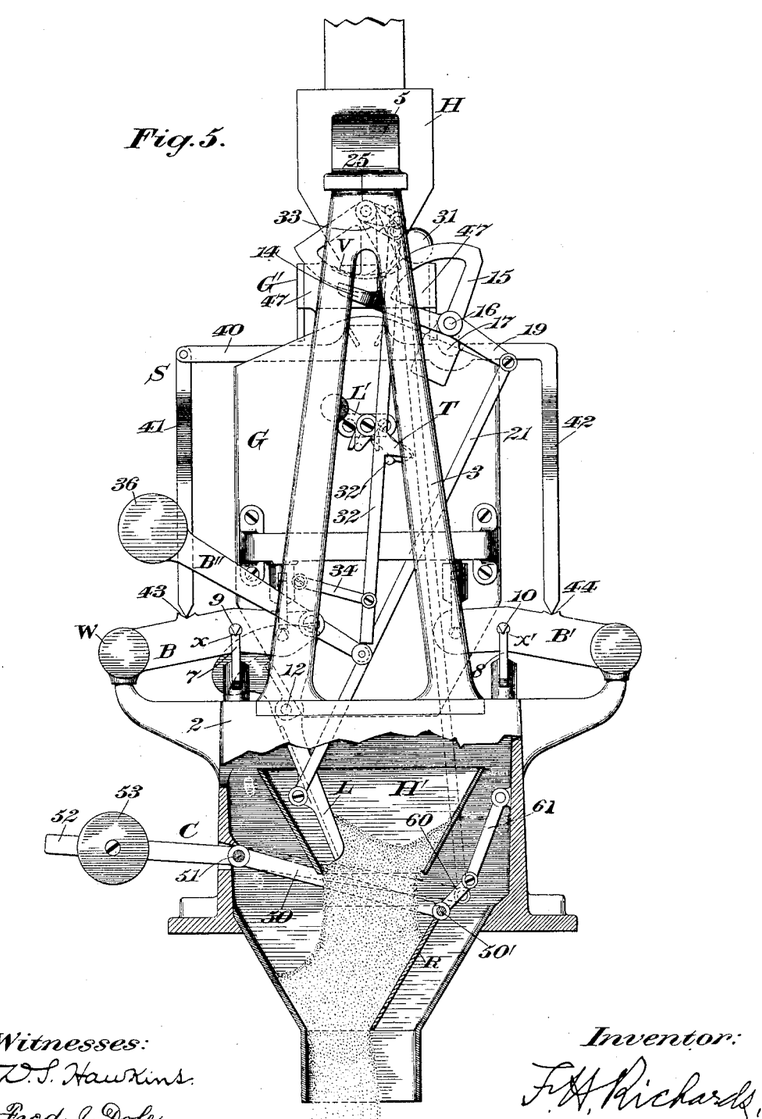
Figure 6:
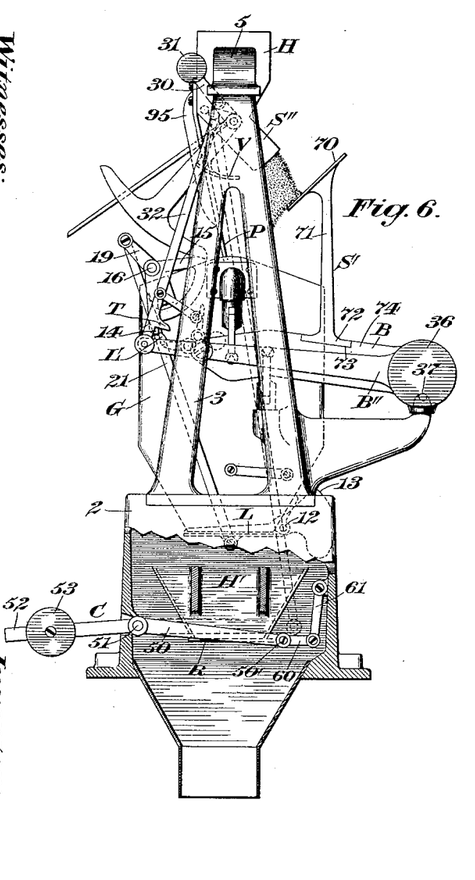
Figs. 6, 7, and 8 are side elevations of a modified form of machine.
Figure 7:
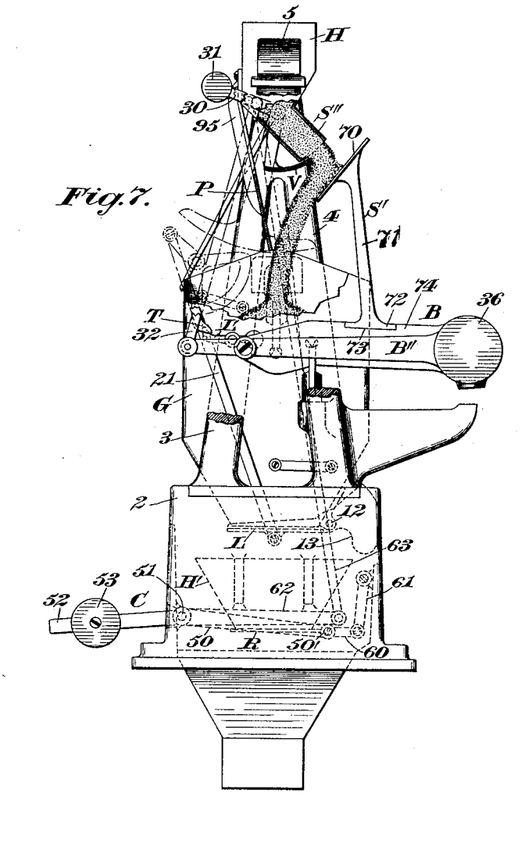

The auxiliary beam B'' consists of a counterweighted lever pivoted at the inner end of the beam B, its weight 36 being provided with the usual projecting pin 37, Figs. 3, 4, 6, and 10, resting on the adjacent weight W of the main beam B, so that the inner end of the beam B'', against which the rod 32 acts, constitutes in effect a rigid extension of the beam B, whereby as the poising portions of the two beams descend the inner end of the beam B'' will move away from the rod 32, thereby permitting the weight 31 to drop and close the valve V, the supply-stream being cut off when the load in the receiver G is completed, as represented in Fig. 5. The auxiliary beam B'', when it returns from the shifted position shown in Fig. 5 to its primary position illustrated in Fig. 2, imparts an upward thrust to the rod 32, which is transferred to the valve V for swinging the same open.

In connection with the weighing mechanism I provide a stream-force transmitter of suitable construction, which is situated, preferably, intermediate the load-receiver and the stream-controller, the latter consisting in the present case of the hopper H. This stream-force transmitter is mounted to receive the impact of the supply-stream prior to its entrance into the load-receiver and to transmit part of the energy or force generated by the falling stream to the counterpoising means, the force of the stream after it leaves the said transmitter being applied to the load-receiver or the material therein, whereby the energy due to the momentum of the stream is distributed substantially equally at opposite sides of the center of movement of the weighing mechanism, so as to neutralize the effect of the stream and thereby prevent the weighing mechanism from being prematurely carried below the poising-line.

The stream-force transmitter is designated by S, and it includes a horizontal portion made up of the side bars 40, having at the opposite ends thereof the two pairs of legs 41 and 42, pointed at their lower ends to form knife-edges, which rest upon the V-shaped bearings 43 and 44, situated at the counterpoising sides of the beams B and B', respectively, the two legs 41 being pivoted to the bars 40, so that the latter will be maintained in a substantially horizontal position as the load-receiver and beam mechanism reciprocate.

The stream-force transmitter proper consists of two oppositely-disposed oblique blades 45 and 46, secured to and extending from the side bars 40, the blades being located in the path of and at such an inclination or angle relatively to the vertical line of flow of the supply-stream as to receive a part of the energy or force due to the momentum of said stream and transmit the same to the counterpoised side of the two scale-beams, the stream subsequently falling into the load-receiver.

For the purpose of preventing waste of the material after it leaves the hopper H and prior to its reception by the load-receiver the guard G' is provided, the latter being in the form of a rectangular box disposed below the hopper and the walls of which serve to prevent the material from escaping. The front of the box is furnished with the lateral flanges or wings 47, secured to the side frames 3 and 4, respectively, in some suitable manner.

For the purpose of receiving the impact of the discharging load I preferably provide, in connection with the weighing mechanism, a regulator, such as R, adapted to control the action of the valve mechanism by preventing the opening of the valve V until the regulator has reached its initial position. The regulator R is pivoted at 50' between the arms 50 of the carrier or lever C, pivoted, as at 51, for oscillation between the end walls of the chambered bed 2. The arm 52 of the carrier or lever C is provided with a counterweight 53 of suitable efficiency, which acts to return the regulator and the lever to their normal positions when the material has passed entirely off from the regulator.

The regulator R serves substantially as a valve when in its normal position for the stationary discharge-hopper H', which is secured in the base 2. The load from the receiver G is emptied into the discharge-hopper H' and falling against the regulator-blade will shift the same downward, thereby through proper instrumentalities holding the valve V shut while said regulator is shifted. When the regulator returns to its normal position, the valve will be opened by the auxiliary beam or actuator B'', as hereinbefore described.

Figure 1:
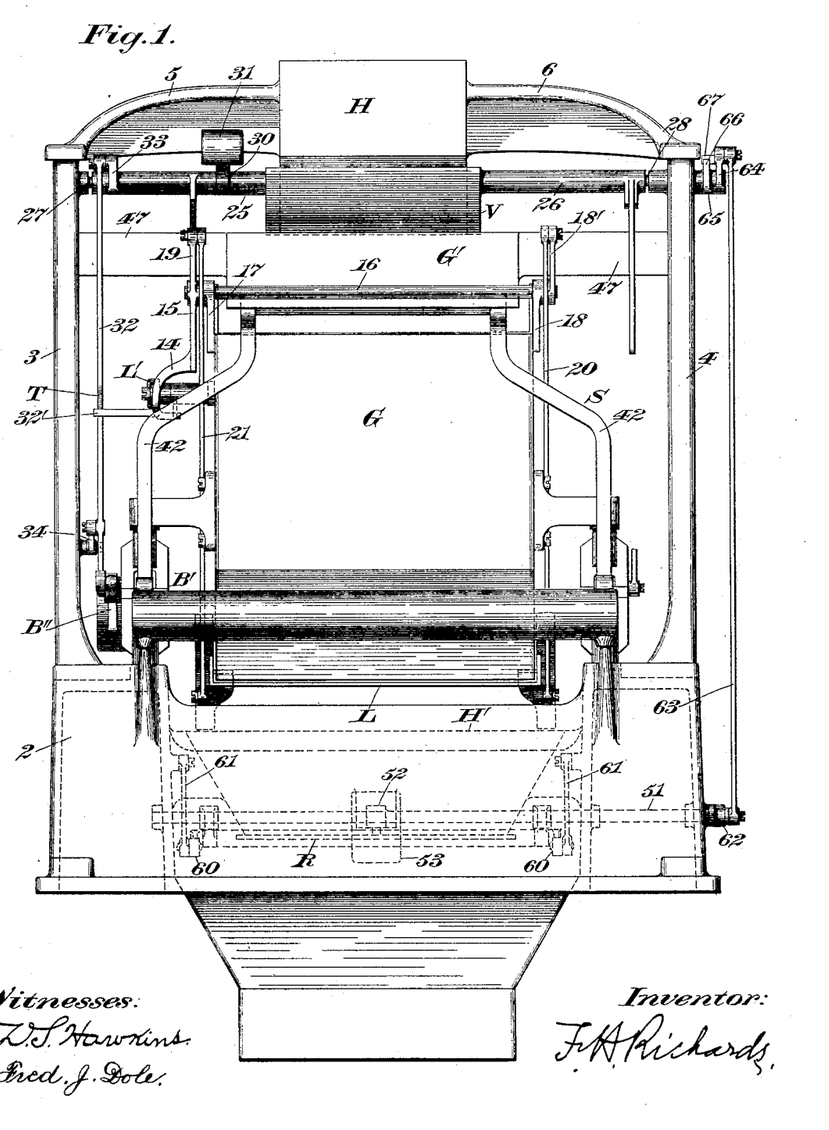
Figure 1 is a rear elevation of my improved weighing-machine.
Figure 2:
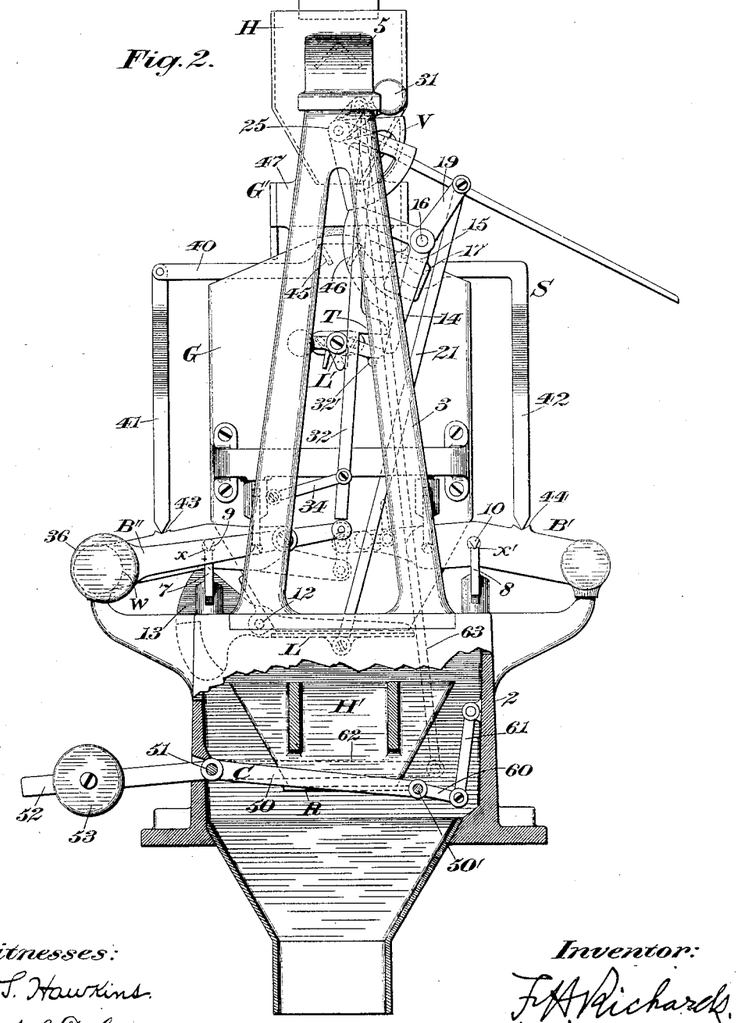
Figs. 2, 3, 4, and 5 are side elevations of the machine as seen from the left in Fig. 1, showing the positions assumed by the different parts during the making and discharging of a load, portions being broken away to illustrate more clearly certain features of the invention.
Figure 3:
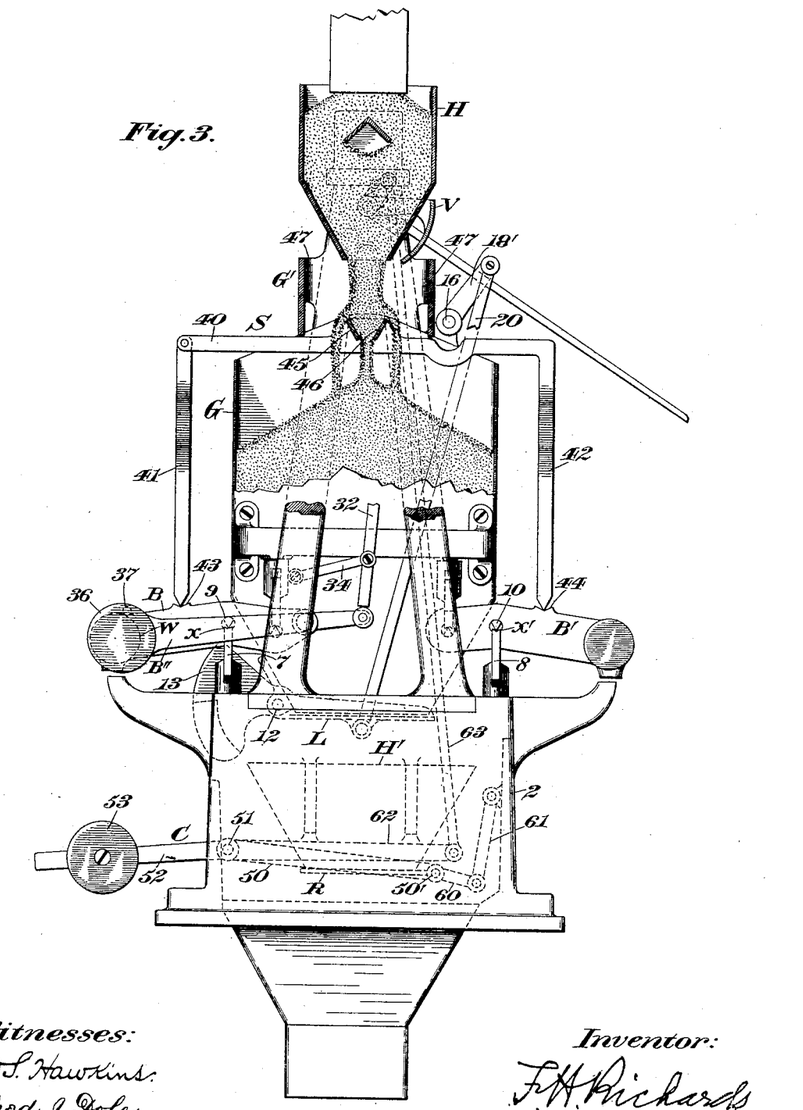
Figure 4:
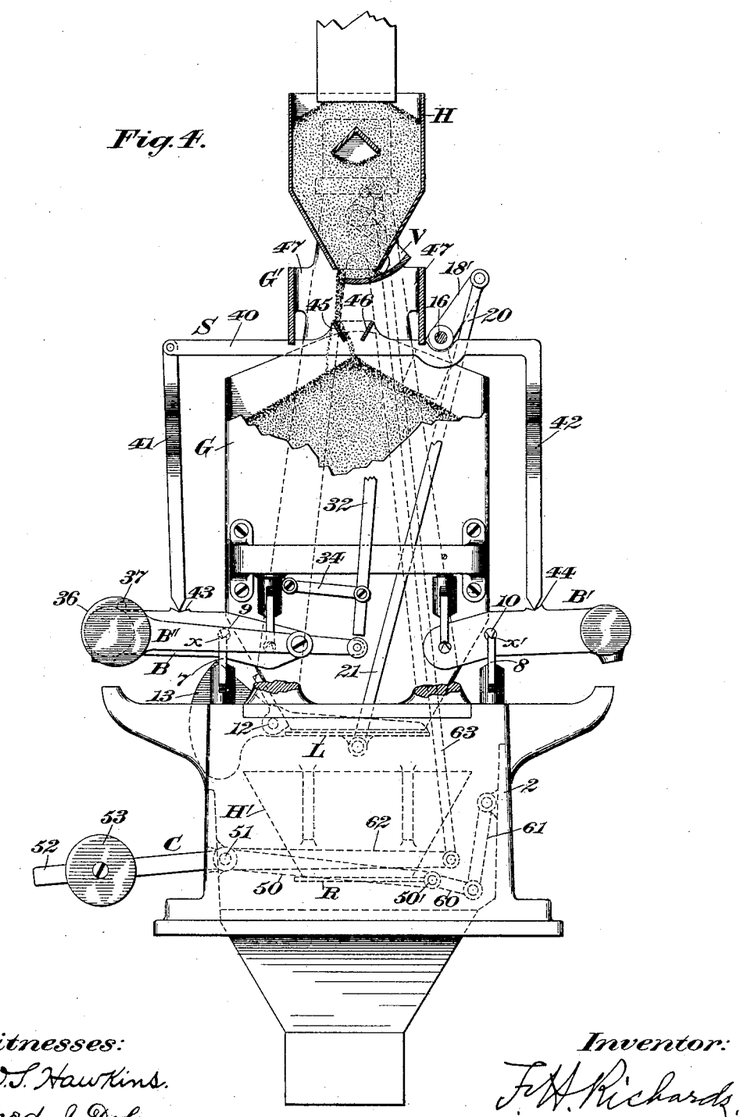

To maintain the regulator in its lower or shifted position for a comparatively long period of time it is connected, preferably, with the framework by toggle mechanism consisting of the pairs of links 60 and 61, the links 61 being pivoted to the rear wall of the base 2, as shown clearly in Figs. 2 and 5. When the regulator R is depressed, the several centers of the toggles will be thrown substantially into line, thereby requiring but a small amount of pressure against the regulator to hold it down. The shaft 51 is provided at its outer end with a crank-arm 62, to which the rod 63 is pivoted, said rod being also pivoted at its upper end to the crank-arm 64, which is sleeved to the valve-supporting pivot or shaft 28, as indicated in Fig. 1. The crank-arm coöperates with the hub or sleeve 65, which is fast on the pivot 28, the hub being provided with the projection or lug 66, which is intended to coact with the projection 67 on the crank-arm 64. As the valve V shuts, the pivot 28, and consequently the hub or sleeve 65 on said pivot, will turn with the valve and the projection 66 will move away from the projection 67. When the regulator is shifted, the rod 63 will be pulled down, which action will carry the projection 67 against the projection 66 to lock the valve V shut until the regulator resumes its primary position, at which time the auxiliary beam B'' will thrust the rod 32 upward for swinging the valve open.

When the load in the receiver G is completed, the tripper T, consisting in the present case of the lateral projection on the rod 32, will strike the pin 32' on the closer-latch L', thereby lowering the working portion of the latch and disengaging it from the coöperating rocker-arm 14, so that the closer L will be released to effect the discharge of the load into the stationary hopper H' for shifting the regulator R in the manner hereinbefore specified.

The operation of the hereinbefore-described machine (illustrated in Figs. 1 to 5, inclusive) is as follows: In Figs. 1 and 2 the closer L is represented shut and held in such position by the latch L', engaging the rocker-arm 14, and the valve V being wide open a stream of large volume will pass from the hopper H and strike the stream-force transmitter S, so that the energy due to the momentum of the stream is applied, respectively and successively, to opposite sides of the weighing mechanism, as hereinbefore specified. When a certain proportion of the load has passed into the receiver G, it with the beam mechanism will descend, and the auxiliary beam B'' by falling away from the rod 32 will permit the valve V to be closed or swung under the hopper H by the weight 31 to cut off the supply-stream, this result being attained when the load is fully completed, at which time the tripper T strikes the pin 32' on the latch L', thereby releasing the closer L, so that the complete load can be emptied into the hopper H', thereby shifting the regulator R and simultaneously throwing the valve-locking means into working position, as hereinbefore specified. When the closer shuts, the weighing mechanism returns to its primary position to repeat the operation as soon as the valve V is released by the regulator mechanism in the manner set forth.

Figures 8, 9, 12:
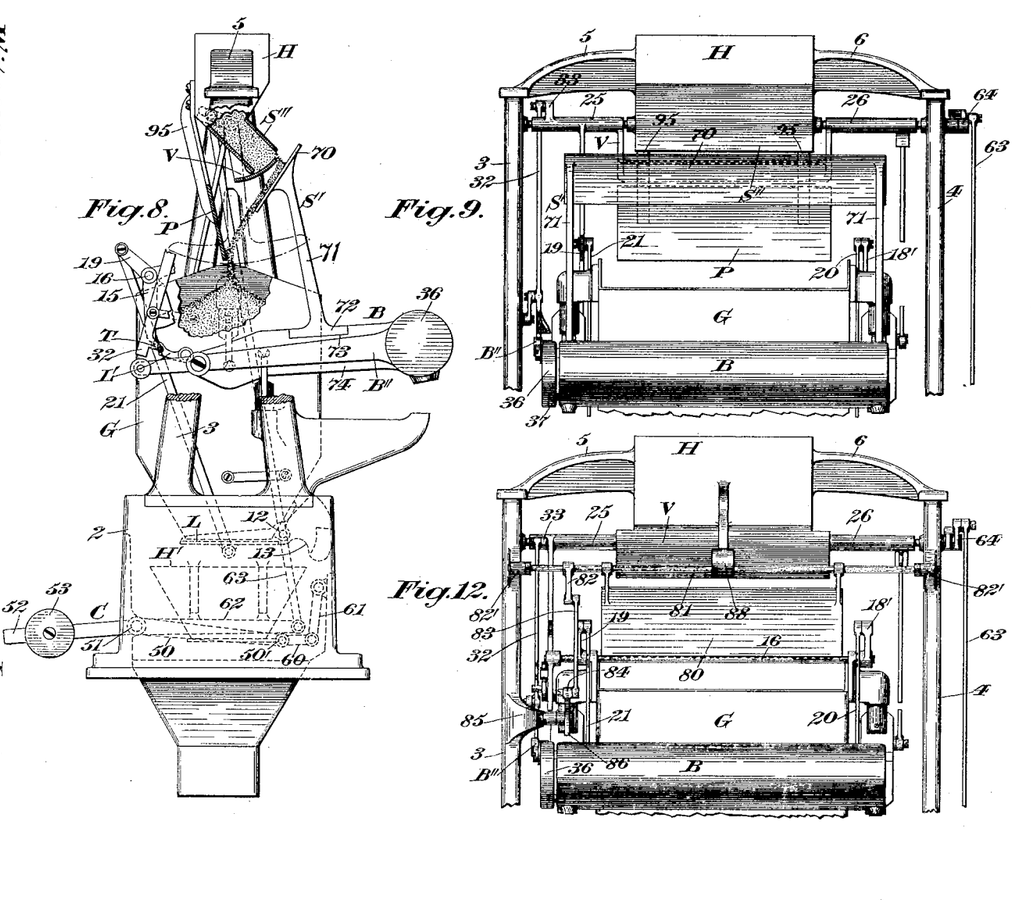
Fig. 9 is a rear elevation of the same.
Fig. 12 is a rear elevation of the same.

In Figs. 6 to 9, inclusive, I have illustrated a modified form of stream-force transmitter, the other parts of the machine being substantially the same as those illustrated in Figs. 1 to 5, inclusive. The load-receiver in Figs. 6 to 9, inclusive, is supported upon a single beam B, to the counterpoised side of which is secured the stream-force transmitter S'. Said transmitter S' consists of a plate or stream-force transmitter proper, 70, set at an angle to the downflowing stream, so as to receive a part of the impact thereof and particularly of the drip-stream, as shown in Fig. 8, and the legs 71, secured to the opposite ends of the plate 70, said legs having tenons 72 at their opposite ends fitted in mortises 73 in the arm 74 of the beam. For the purpose of directing the stream at the proper angle to the plate 70 the spout S'' of the hopper H is deflected from the main part thereof, as represented clearly in Figs. 6, 7, and 8. To guide the stream toward the load-receiver G after it passes from the plate 70, I provide a plate P, which is located transversely to said plate 70, as indicated in Figs. 6 to 9, inclusive, said plate P being disposed in the path of the stream and serving to deliver the same vertically into the receiver G and also to prevent spattering and waste of material. The plate P has at its opposite ends the arms 95, the upper ends of which are attached to the hopper H.

The operation of the machine shown in Figs. 6, 7, 8, and 9 being the same as that represented in the preceding figures a description thereof is deemed unnecessary.

Figure 10:
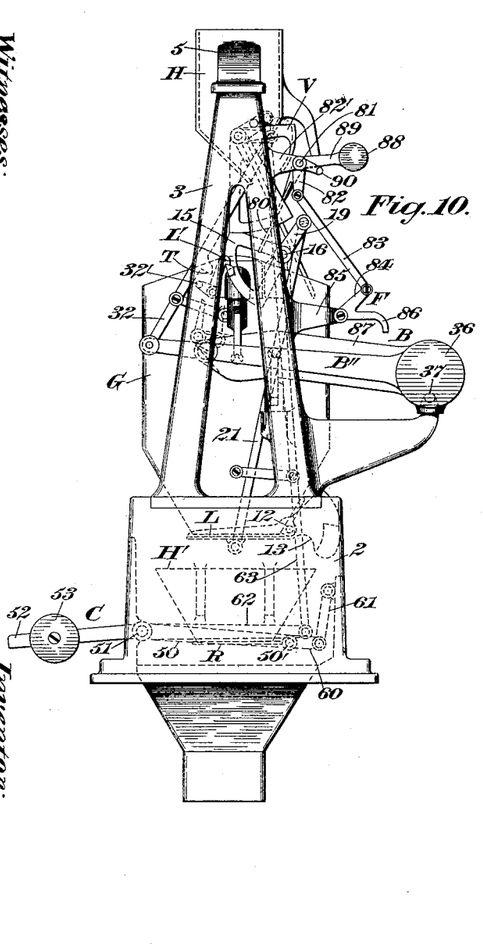
Figs. 10 and 11 are side elevations of another modified form of the machine.
Figure 11:
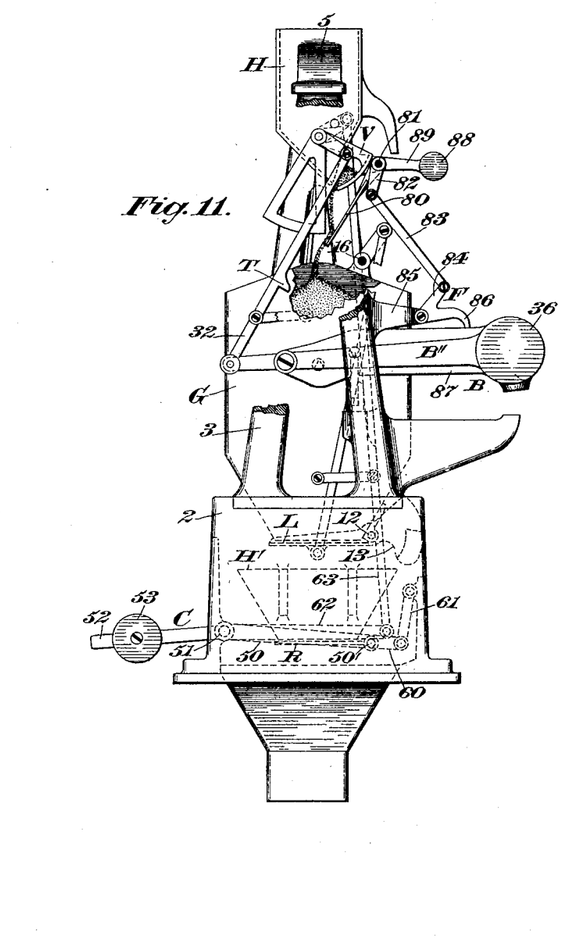

In Figs. 10, 11, and 12 I have shown another modified form of stream-force transmitter, it being carried upon the framework and operable through proper connections for transmitting the force or energy due to the momentum of the drip-stream (this being the usual factor that tends in practice to impair the accuracy of the load) to the counterpoised side of the beam B. The device illustrated consists of a plate 80, secured to the rock-shaft 81, journaled in the brackets 82' on the side frames 3 and 4, respectively, the shaft 81 having at one end the crank-arm 82, to which is pivoted the link 83, said link being likewise joined to the arm 84 of the force-transmitter F, which is pivoted at its angle to the bracket 85 on the side frame 3, the leg 86 of the part F being in position to act against the arm 87 of the beam B when said beam has nearly reached the so-called "poising-line." The plate 80 is held in the path of the drip-stream from the hopper H by the weight 88 on the arm 89, affixed to the rock-shaft 81, the motion of the arm being limited by the stop 90, extending outward from the shaft support or bearing 82'. By mounting the plate in the manner above set forth it will yield or slightly give if unusually large lumps of material in the mass composing the supply-stream should strike the same. When the parts are in their primary positions, (shown in Fig. 10,) the leg 86 will be slightly above the beam-arm 87 and will not touch the same until said beam-arm has nearly reached the poising-line, as indicated in Fig. 11, at which time the energy due to the momentum of the drip-stream, for the reasons hereinbefore set forth, is applied substantially equally to the beam at opposite sides of its axis to prevent the weighing mechanism from prematurely acting.

I have shown in the drawings certain valve and closer interlocking stop mechanism and valve-intercepting means for arresting the advancing progress of the valve, but deem it unnecessary to describe the same, such features being common in the art.

Having described my invention, I claim—

1. The combination, with weighing mechanism including a load-receiver, of stream-supplying means for the load-receiver; a stream-controller; and means independent of the stream-controller and in position and adapted to effect the transmitting of the force generated by the impact of the supply-stream to different points on said weighing-machine.

2. The combination, with weighing mechanism including a load-receiver and means for sustaining the same, of stream-supplying means; a stream-controller; and a device independent of the stream-controller and located to receive the impact of the supply-stream, and to transmit the force or energy generated by said stream to said weighing mechanism and thereby retard the descent of the load-receiver.

3. The combination with weighing mechanism including a load-receiver, of stream-supplying means for said load-receiver; a stream-controller; a device independent of the stream-controller and located to receive the impact of the supply-stream, and to transmit the force or energy generated thereby to one side of the weighing mechanism, the load-receiver being mounted to receive the force of impact at the opposite side of the weighing mechanism at a different period.

4. The combination, with poising and counterpoising means, the poising means including a load-receiver, of stream-supplying means; a stream-controller; and a device independent of the stream-controller and located to receive the impact of the supply-stream, and to transmit part of the force or energy generated by said stream to the counterpoising means.

5. The combination, with poising and counterpoising means, the poising means including a load-receiver, of stream-supplying means; a stream-controller; and a device located between the stream-controller and the load-receiver, and adapted to receive the impact of the supply-stream and to transmit part of the force and energy generated by said stream to the counterpoising means, said device being supported independently of the stream-controller.

6. The combination, with poising and counterpoising means, the poising means including a load-receiver, of stream-supplying means for the load-receiver; a stream-controller; and a device independent of the stream-controller and located to receive the impact of the supply-stream, and to transmit part of the force or energy generated by said stream to the counterpoising means, said device having a plate disposed in the path of the supply-stream.

7. The combination, with poising and counterpoising means, the poising means including a load-receiver, of stream-supplying means for the load-receiver; a stream-controller; and a device independent of the stream-controller and located to receive the impact of the supply-stream, and to transmit part of the force or energy generated by said stream to the counterpoising means, said device having an obliquely-disposed plate situated in the path of the supply-stream.

8. The combination, with poising and counterpoising means, the poising means including a load-receiver, of stream-supplying means for the load-receiver; a stream-controller; and a stream-force transmitter intermediate to the stream-controller and the load-receiver and located to receive the impact of the supply-stream, said transmitter bearing at several points upon the counterpoising means.

9. The combination, with a load-receiver and supporting-beam mechanism therefor, of stream-supplying means for the load-receiver; a stream-controller; and a stream-transmitter independent of the stream-controller and located to receive the force of impact of the supply-stream, and to transmit part of the force or energy generated by said stream to the beam mechanism.

10. The combination, with a load-receiver and supporting-beam mechanism therefor, of stream-supplying means for the load-receiver;

a stream-controller; and a stream-force transmitter located between the stream-controller and the load-receiver and having blades resting on the counterpoised side of the beam mechanism.

11. The combination, with a load-receiver, of a plurality of scale-beams; stream-supplying means for the load-receiver; and a stream-force transmitter located to receive the impact of the supply-stream and having a horizontal portion provided with legs resting on the beams, said horizontal portion being provided with a device disposed in the path of movement of the supply-stream.

12. The combination, with a load-receiver, of scale-beams; stream-supplying means for the load-receiver; a stream-force transmitter located to receive the impact of the supply-stream and having a horizontal portion provided with legs resting on the scale-beams, some of the legs being movably connected with said transmitter, and the horizontal portion of said transmitter being provided with a device disposed in the path of movement of the supply-stream.

13. The combination, with a load-receiver, of scale-beams for sustaining the same; means for supplying a stream of material to said load-receiver; and a stream-force transmitter located to receive the impact of the supply-stream and having a horizontal portion provided at one end with rigid legs and at the other end with pivoted legs, said legs resting on the scale-beams.

14. The combination, with a load-receiver, of beam mechanism; stream-supplying means for the load-receiver; a stream-controller and a stream-force transmitter located to receive the impact of the supply-stream and having inclined plates independent of the stream-controller.

15. The combination, with a load-receiver, of a plurality of scale-beams having notched bearings; stream-supplying means for the load-receiver; and a stream-force transmitter located to receive the impact of the supply-stream and to transmit a part of the force or energy generated by the same to the scale-beam, said transmitter having legs with knife-edges resting on the notched bearings.

16. The combination, with a load-receiver, of an oscillatory scale-beam; stream-supplying means for the load-receiver; a stream-controller and a stream-force transmitter independent of the stream-controller located to receive the impact of the supply-stream and to transmit part of the force or energy generated by the same to said scale-beam at one side of the axis thereof.

17. The combination, with a load-receiver, of a pivotally-mounted conterweighted scale-beam for supporting the same; stream-supplying means for said load-receiver; a stream-controller and a stream-force transmitter independent of the stream-controller located to receive the impact of the supply-stream and to transmit part of the force generated by the same to the scale-beam.

18. The combination, with a load-receiver and supporting-beam mechanism therefor, of a supply-hopper; a stream-controller for the hopper; and a stream-force transmitter independent of the stream-controller and located to receive the impact of the supply-stream flowing from said hopper and to transmit part of the force generated by said stream to the scale-beam.

19. The combination, with weighing mechanism including a load-receiver, of a stationary discharge-hopper below the load-receiver; an independently-supported regulator serving normally as a valve for said hopper; a carrier for the regulator; a supply-valve; and means intermediate the regulator and the valve for blocking the action of the latter.

20. The combination, with weighing mechanism including a load-receiver, of a stationary discharge-hopper below the load-receiver; an independently-supported regulator connected with the framework by a toggle; a carrier for the regulator; a supply-valve; and means intermediate the regulator and the valve for blocking the action of the latter.

21. The combination, with weighing mechanism including a load-receiver, of a stationary discharge-hopper below the load-receiver; an independently-supported regulator; a counterweighted lever for carrying the regulator; a supply-valve; and means intermediate the regulator and the valve for blocking the action of the latter.

22. The combination, with weighing mechanism including a load-receiver, of regulator mechanism located below the same; a rod connected to the regulator mechanism; a supply-valve; a shaft for supporting the same having a hub fixed thereto, said hub having a projection; and a crank-arm sleeved to said shaft and provided with a coöperating projection, the crank-arm being connected with said rod.

23. The combination, with weighing mechanism including a load-receiver, of a stationary hopper; a regulator below the same; a counterweighted lever connected with the regulator; a shaft carrying said counterweighted lever; a toggle connected, respectively, with the regulator and the framework; an arm on said shaft; valve mechanism; and a connection between the valve mechanism and said arm.

FRANCIS H. RICHARDS.

Witnesses:
F. N. CHASE,
FRED. J. DOLE.